Aug. 10, 1965　　　A. HAMILTON　　　3,199,161
RELEASABLE CATCH APPARATUS FOR
A CABLEWAY LOAD CARRIER
Filed Dec. 18, 1963　　　　　　　　2 Sheets-Sheet 1

INVENTOR
ALEXANDER HAMILTON
BY
*Featherstonhaugh & Co.*
ATTORNEYS

Aug. 10, 1965

A. HAMILTON 3,199,161

RELEASABLE CATCH APPARATUS FOR
A CABLEWAY LOAD CARRIER

Filed Dec. 18, 1963

INVENTOR
ALEXANDER HAMILTON
BY
Fetherstonhaugh & Co.
ATTORNEYS

United States Patent Office 3,199,161
Patented Aug. 10, 1965

3,199,161
RELEASABLE CATCH APPARATUS FOR A CABLEWAY LOAD CARRIER
Alexander Hamilton, 4871 Union St., North Burnaby, British Columbia, Canada
Filed Dec. 18, 1963, Ser. No. 331,459
4 Claims. (Cl. 24—132)

This invention relates to load carriers movable over a cableway and particularly to the load suspension apparatus therefor.

In the use of cableway carriage systems, the loads to be carried generally have to be hoisted some considerable distance above the ground, transported along the cableway, then lowered again some considerable distance from the cableway in order to release the loads. The load line to which the load is attached and which is supported by the carrier, is normally moved by a powered winding drum to hoist the load above the ground. It is very difficult, however, to operate the load line and at the same time move the carrier along the cableway. Apparatus has heretofore been devised whereby the load may be lifted up to the carrier and fastened there, to permit the load line to be slacked off and the carriage or carrier operated along the cableway, said apparatus being arranged whereby it may be released remote from the carriage in order to lower the load therefrom once it has reached its destination.

Where extraordinary heavy loads are being handled, it is apparent that the latch apparatus must be sufficiently strong so that any danger of the latch opening, due to damage of the parts, etc., will be eliminated. In order to obtain the strength necessary, the parts of the latch must be heavy yet sufficiently flexible to permit easy and positive operation.

Latch apparatus presently devised has not been entirely successful, due primarily to the complexity of such apparatus, which has resulted in a multiplicity of working parts, a feature which makes said apparatus relatively costly and which does not lend itself to ruggedness of construction.

The present invention provides a latch apparatus, the operation of which may be effected by movements of the line to which the load is affixed, and which by its simplicity of construction and operation lends itself to use in circumstances where extraordinary heavy loads must be carried.

The present invention also provides a latch which is only releasable upon upward movement of the load line to which the load is attached, thereby preventing accidental release of the load before the load line is ready to take the strain thereof.

The present invention comprises a pair of elongated latch members having upper and lower ends, pivotally connected to the carriage on axes intermediate their ends for pivotal movement in a vertical plane and spaced apart to permit the passage of a load line therebetween, said members having concave opposing faces forming a section therebetween and having their lower ends formed as downwardly diverging cam surfaces, stops on the carriage arranged in the path latch members to limit pivotal movement of the latter between a latch position in which the upper ends are spaced apart in relatively close proximity to the load line and an open position in which said upper ends are moved apart to move the lower ends towards each other to a position in close proximity to the load line on the other side thereof, restraining means to releasably engage the latch members when they are moved to each position to secure the latter against accidental movement from said position, a catch block presenting a cam-like shoulder as its upper surface connected to the cable for vertical movement therewith, said catch block being adapted to pass freely downwardly between the latch members when the latter are in their open position, the upper ends of said members lying in the path of the catch block when said members are in their latch position, a stop fixedly secured to the load line for movement therewith and spaced downwardly thereon from the catch block, an operator having cam-like upper and lower surfaces, slidably connected to that portion of the load line between the catch block and stop for vertical movement between the latter, whereby upon upward movement of the line to pass the catch block above the upper ends of the latch members, the stop will move the operator against the cam surfaces at the lower ends of said latch members to pivotally move the members into a latch position below the catch block, said operator being adapted, upon further upward movement of the line to pass through said lower ends and bear upwardly against the upper ends of the latch members to pivotally move same into their open position, said restraining means being adapted to retain the latch members in the latter position against the weight of the operator when the load line is lowered, to permit the catch block to pass downwardly through the open upper ends of the latch members and bear against the upper surface of the operator to thereby pivotally move the latch members against the action of restraining means into their open position to permit the operator and catch block to pass downwardly therethrough.

In the drawings which illustrate the embodiments of the invention,

Figure 5:
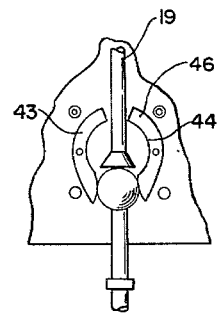
Figure 6:
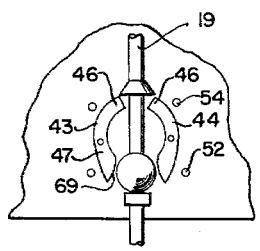
Figure 7:
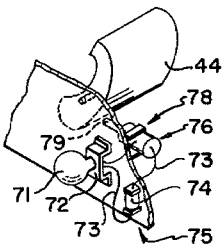
Figure 8:
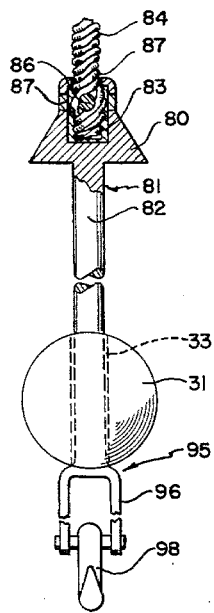
Figure 9:
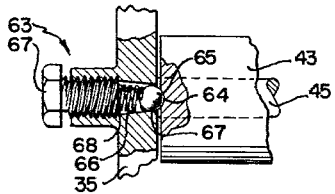
Figure 10:
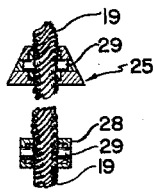

FIGURES 3 to 6 are diagrammatic representations of the apparatus in various positions of its operation, FIGURE 7 is a partial isometric view illustrating the electrical signalling device, FIGURE 8 is a view of an alternate embodiment of the invention partially in section, FIGURE 9 is a section through a typical detent, and FIGURE 10 is a cross section through the catch block and stop on the load line.

In the drawings and specification hereafter, reference will be made to the use of an application of the latch apparatus in conjunction with the cableway carriage. It is not intended that the latch apparatus should be so limited in use as it may be used in conjunction with varied types of load carriers, such as overhead cranes, where vertically movable cables, shafts and the like are employed to hoist loads preliminary to transportation thereof.

Referring to the drawings in which is illustrated the use of the latch apparatus in conjunction with a cableway carriage, the numeral 10 indicates a cableway which may be suspended in the usual manner and along which the carriage is moved for locating the load of the carriage in any desired position. The carriage comprises a pair of side plates 11 spaced apart by spacers 12 carried over suitable bolts 13 which tie the plates together, to receive between them the cableway 10. Carrier sheaves 15 are rotatably mounted between the plates 11 near their upper edges, said sheaves being adapted to receive the cableway 10 to movably support the carriage thereon. A hoisting sheave 17 is rotatably supported between plates 11 at a point below the carrier sheaves 15 to support a load line 19, the free end 20 of which depends vertically downwardly therefrom and has a hook or other device secured thereto to which a load may be fastened. The other end of the load line 19 is secured to a powered winding drum, not shown, and controlled such that it may be payed out or taken in. The winding drum and the controls thereof are not shown as apparatus of this nature is well known to those skilled in the art.

A haul-in line 22 is also secured to the carriage as at 23, said haul-in line also being secured to a powered winding drum in the usual manner to permit it to be payed out or hauled in.

That portion of the load line depending vertically from the hoisting sheave 17 is provided with a catch block 25, the latter being conical in shape, having sloped shoulders 26 and a substantially flat base 27. The manner of securing said catch block to the line will be described hereinafter.

The load line 19 has also secured to it, at a point spaced downwardly from the catch block 25, a stop 28 which is rectangular in shape. Both the stop 28 and catch block 25 are secured in a manner as shown in FIGURE 10 of the drawings. Both are of hollow construction to permit the load line 19 to be passed therethrough, the latter having a pin 29 or the like, forced therethrough to bulge that portion lying within the catch block and stop, the space between the load line 19 and the walls of stop or catch block being filled with molten metal or the like.

Slidably secured to the line 19 between the catch block 25 and stop 28 is an operator 31, said operator being spherical in shape and having a bore 33 formed centrally therethrough, said bore being adapted to slidably receive the load line 19 to permit the operator to freely slide thereon. The operator 31 is limited in its trap between the stop 28 on one side thereof and catch block 25 at the other. A pair of cheek plates 35 and 36 pivotally depend from a pair of pintles 38 and 39 which project outwardly from side plates 11, said pintles being located opposite each other or either side of the periphery of the hoisting sheave 17 at a point at which the vertical portion of the load line 19 lies tangential to the sheave when the carriage is situated on a horizontal portion of the cableway 10. The cheek plates 35 and 36 are held in rigid spaced parallel disposition in much the same manner as side plates 11 of the carriage, by bolts and spacers 42.

A pair of arcuately shaped latch members 43 and 44 are pivotally secured on either side of the load line 19 between the cheek plates 35 and 36 on shafts 45 which extend horizontally between said plates, the pivotal axes of each of the members is at a point intermediate the upper ends 46 and the lower ends 47 thereof. Said members having their concave sides facing each other to form a substantially circular operator receiving recess 49 therebetween, the members 43 and 44 are spaced apart such that the general diameter of the recess as defined in portion by the concave sides of the latch members, is substantially larger than the diameter of the operator 31. The latch members are pivotally movable about their pivotal axes between a latched position in which their upper ends 46 are swung towards each other, their lower ends 47 being spaced apart, and an open position in which the lower ends 47 are swung together, their upper ends 46 being spaced apart. Stops 52 which may be in the form of bolts and spacers as hereinbefore described are located in the path of the portions of the latch members 43 and 44 lying below their pivotal axes to limit the spread of said lower ends and thereby limit the spacing of the upper ends 46 in the latter's latch position. Stops 54 which may be of similar construction as stops 52 are located to limit the outward movement of the upper ends 46 of the latch members 43 and 44 in their open position. The apparatus is also provided with means to releasably hold the members 43 and 44 against accidental movement when the latter have been moved into either the latch or open position, said means comprising in a preferred form, a pair of spring-urged ball detents 63 secured to one of the cheek plates 35 and arranged in pairs to seat themselves in hemispherical seats 64 formed in the latch member when the latter members have reached either their latch or open positions. A typical ball type detent 63 is shown in FIGURE 9 and comprises a ball 65 insertable into a passage 66 formed through the cheek plate 35, said passage having its walls constricted at the inner surface thereof to form a seat 67 for the ball 65, whereby the ball projects a little beyond the planar face of the inner side of said cheek plate. A coil spring 68 is insertable into the passage 66 behind the ball and pressed against the latter by the shank of a bolt 67 which is threaded into the passage 66 from the outer surface of the cheek plate, said bolt providing means to adjust the pressure of the spring outwardly against the ball, thereby providing a means whereby the force applied to one of the latch members 43 or 44 to move it against the action of the ball 65 against the hemispherical seat 64 may be predetermined.

It may be noted here that the lower ends 47 of the latch members 43 and 44 are shaped to form outwardly and downwardly diverging cam surfaces 69, whereas the upper ends 46 are shaped to present substantially horizontal surfaces when said latch members are in their latched position.

The shape of each of the latch members 43 and 44 is such that when said members are in their latched position, the upper ends 46 thereof are spaced apart sufficiently for the load line 19 to pass freely therebetween, but lie in the path of the catch block 25. In this position also, the lower ends 47 are spaced apart sufficiently to permit the passage of the operator therebetween. In their open position, the latch members 43 and 44 will assume a position in which the upper ends 46 thereof are spaced apart sufficiently to permit the passage of the catch block, but will not permit passage of the operator. In this latter position, the lower ends 47 are spaced apart sufficiently to permit free passage of the load line 19 and stop 28, but lie in the path of the operator 31. In this latter position, the appropriate detents 63, which retain the latch members 43 and 44 in their open position, exert sufficient force against their corresponding hemispherical seats 64 to prevent said latch members from moving out of their open position against the weight of the operator 31 resting on the lower portions of said latch members as the apparatus is moved through its various positions as hereinafter described.

Figure 1:
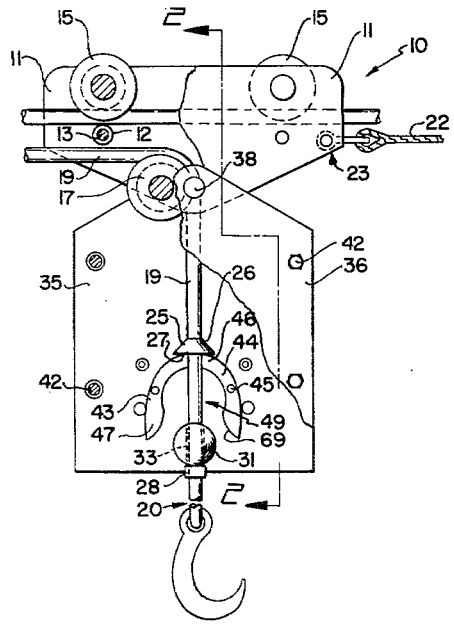
FIGURE 1 is a side elevation of the apparatus partially in section.
Figure 2:
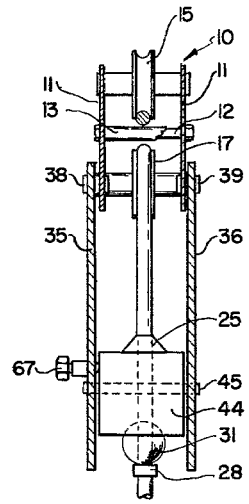
FIGURE 2 is an end view on line 2—2 of FIGURE 1.

The operation of the apparatus may be best described with reference to FIGURES 1, 3 to 6. In FIGURE 1, the latch members 43 and 44 are shown in their latched position, arranged beneath the base 27 of the catch block 25. It will be seen that in this position, the weight of the load, which we will assume is being carried by the free end 20 of the load line 19, is being carried solely by the action of the latch members against the catch block. In this position, the load line may be slacked off and the carriage moved one way by operating the haul-in line 22 or it may be moved the other way by applying sufficient force to the load line 19 by the winding drums provided for that purpose. In this position also, the operator 31 which is slidable on the load line 19 lies below the lower ends 47 of the latch members and is supported by the stop 28.

Figure 3:
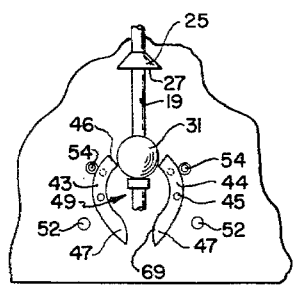
Figure 4:
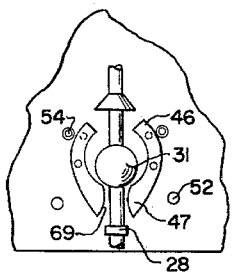

When the carriage has been moved by either the haul-in line 22 or load line 19 to a location at which it is desired to lower the load, the haul-in line 22 is held secure and the load line 19 taken in, thereby lifting the catch block 25 from the upper ends 46 of the latch members. At the same time, the operator 31 is drawn upwardly through the lower ends 47 of said latch members and against the underside of said upper ends, pivoting said latch members into their open position against stops 54 in which position the balls 65 of the detent 63 snap into their appropriate hemispherical seats 64. The arrangement of the parts in this position is as shown in FIGURE 3. The load line 19 is then lowered to permit the stop 28 to pass downwardly between the lower ends 47 of the latch members. The operator 31, however, being wider than the opening provided by the open lower ends 47 of the latch members contacts said lower ends, the parts assuming a position as shown in FIGURE 4. It will be seen that if the latch members 43 and 44 were not restrained in this latter position, the operator would pivot the members into their latched position. However, the detents 63 engaging their appropriate hemispherical seats 64 may be adjusted by means of the bolts 67 to provide sufficient gripping force to prevent movement of the latch members out of the latter position against the weight of the operator.

The catch block 25 is lowered through the open upper ends 46 of said latch members into the recess 49 against the upper surface of the operator 31, the weight of the load downwardly increasing the pressure of the catch block against the lower ends of the latch members to pivot the latter about their pivotal axes into their latched position, the latter arrangement being shown in FIGURE 5, to permit the passage of the operator and catch block therethrough and thereby permit the load line 19 to be lowered to its full extent.

When it is desired to again hoist a load and again move the latch apparatus into its latched position, as shown in FIGURE 1, the load line is elevated to permit the catch block to pass between the latch members and upwardly above the upper ends 46 thereof, the sloped shoulders 26 of said catch block riding between said upper ends as a wedge to pivot the latch members out of their latched position sufficiently to permit the passage of the catch block therethrough. At the same time, the operator 31 is drawn upwardly by the stop 28 against the cam surfaces 69 formed on the lower ends 47 of the latch members, to spread said lower ends and move the latch members into their latched position beneath the catch block, in which position they are retained by the detents 63. This latter arrangement of the parts is shown in FIGURE 6. The load line 19 is then lowered until the base of the catch block rests against the upper ends 46 of the latch members, the parts assuming a position as shown in FIGURE 1.

In the operation of the usual cableway carriage, the controls governing the operation thereof are usually situated at some distance remote from the loading and unloading points. It is appreciated, therefore, that difficulties might arise in ascertaining the disposition of the parts of the latch apparatus through their varying positions, as shown in the figures foregoing and, consequently, when attempting to move the latch members to their latched position into the path of the undersurface of the catch block, as shown in FIGURE 6, the operator 31 may accidentally be moved too far upwardly to thereby move their latch members into their open position, as shown in FIGURE 3. A signalling means is therefore provided to indicate when the latch members have moved to their latched position to thereby enable the individual controlling the carriage to halt the upward movement of the load line before the operator engages the upper ends of said latch members.

The signalling means according to the present apparatus comprises an electric lamp 71 mounted on a bracket 72 on the carriage and powered through leads 73 leading to a battery 74 also secured as at 75 to the carriage, said leads being connected to a pressure switch 76 of any suitable type. The pressure switch is secured to the inner surface of one of the cheek plates as at 78, so that a plunger 79 thereof lies in the path of a lower portion of one of the latch members 44, whereby as said latch members swing to their latched position, the plunger of the pressure switch 76 will be depressed to close the circuit to the lamp, thereby activating the latter.

In the foregoing description of the latch apparatus, it will be noted that reference has been made to the securing of catch block 25 and stop 28 independently of each other, to the load line 19. However, that portion of the load line between said catch block and stop may be formed as a flexible, or if desired rigid rod, the catch block and stop being formed as integral parts thereof at the top and bottom thereof. This embodiment is shown in FIGURE 8 of the drawings, in which a hollow catch block numbered 80 is formed integrally with the upper end 81 of a shaft 82. Said catch block receiving the lower end 83 of load line 84 and being secured therein by a transverse pin 86 and soft metal filler 87 much in the same manner as catch block 25 and stop 28 are secured to load line 19. The stop 95 at the lower end of the shaft 82 may be formed as a link 96 from which a loading hook 98 may depend.

In the application therefore the use of the word "line" as applied to the load line shall be deemed to include the shaft or rod 82 hereinbefore referred to.

What I claim as my invention is:

1. A releasable latch apparatus for a cableway load carrier having a carriage movable on a cableway and a load line movably depending therefrom comprising, a pair of elongated latch members, having upper and lower ends, pivotally connected to the carriage on axes intermediate their ends for pivotal movement in a vertical plane and spaced apart to permit the passage of a load line therebetween, said members having concave opposing faces forming a recess therebetween and having their lower ends formed as downwardly diverging cam surfaces, stops on the carriage arranged in the path of the latch members to limit pivotal movement of the latter between a latch position in which the upper ends are spaced apart in relatively close proximity to the load line and an open position in which said upper ends are moved apart to move the lower ends towards each other to a position in close proximity to the load line on each side thereof, restraining means to releasably engage the latch members when they are moved to each position to secure the latter against accidental movement for said positions, a catch block presenting a cam-like shoulder as its upper surface connected to the cable for vertical movement therewith, said catch block being adapted to pass freely downwardly between the latch members when the latter are in their open position, the upper ends of said members lying in the path of the catch block when said members are in their latch position, a stop fixedly secured to the load line for movement therewith and spaced downwardly thereon from the catch block, an operator, having cam-like upper and lower surfaces, slidably connected to that portion of the load line between the catch block and stop for vertical movement between the latter, whereby upon upward movement of the line to pass the catch block above the upper ends of the latch members, the stop will move the operator against the cam surfaces at the lower ends of said latch members to pivotally move the members into a latch position below the catch block, said operator being adapted, upon further upward movement of the line to pass through said lower ends and bear upwardly against the upper ends of the latch members to pivotally move same into their open position, said restraining means being adapted to retain the latch members in the latter position against the weight of the operator when the load line is lowered, to permit the catch block to pass downwardly through the open upper ends of the latch members into the recess and bear against the upper surface of the operator to thereby pivotally move the latch members against the action of the restraining means into their open position to permit the operator and catch block to pass downwardly therethrough.

2. A releasable latch apparatus as claimed in claim 1 in which the operator is a spherically-shaped body having a passage formed therethrough, said passage being adapted to slidably receive the load line.

3. A releasable latch apparatus for a cableway load carrier having a carriage movable on a cableway and a load line movably depending therefrom comprising, a pair of elongated latch members, having upper and lower ends, pivotally connected to the carriage on axes intermediate their ends for pivotal movement in a vertical plane and spaced apart to permit the passage of a load line therebetween, said members having concave opposing faces forming a recess therebetween and having their lower ends formed as downwardly diverging cam surfaces, stops on the carriage arranged in the path of the latch members to limit pivotal movement of the latter between a latch position in which the upper ends are spaced apart in relatively close proximity to the load line and an open position in which said upper ends are moved apart to move the lower ends towards each other to a position in close proximity to the load line on each side thereof, restraining means to releasably engage the latch members when they are moved to each position to secure the latter against accidental movement from said position, a catch block presenting a cam-like shoulder as its upper surface connected to the cable for vertical movement therewith, said catch block being adapted to pass freely downwardly between the latch members when the latter are in their open position, the upper ends of said members lying in the path of the catch block when said members are in their latch position, a stop fixedly secured to the load line for movement therewith and spaced downwardly thereon from the catch block, an operator, having cam-like upper and lower surface, slidably connected to that portion of the load line between the catch block and stop for vertical movement between the latter, whereby upon upward movement of the line to pass the catch block above the upper ends of the latch members, the stop will move the operator against the cam surfaces at the lower ends of said latch members to pivotally move the members into a latch position below the catch block, said operator being adapted, upon further upward movement of the line to pass through said lower ends and bear upwardly against the upper ends of the latch members to pivotally move same into their open position, said restraining means being adapted to retain the latch members in the latter position against the weight of the operator when the load line is lowered, to permit the catch block to pass downwardly through the open upper ends of the latch members into the recess and bear against the upper surface of the operator to thereby pivotally move the latch members against the action of the restraining means into their open position to permit the operator and catch block to pass downwardly therethrough, and signalling means carried by the carriage and arranged to the path of the latch members to be activated as the latter are moved to their open position so as to serve as warning whereby the upward movement of the line, as the operator is moved upwardly between the lower ends of the latch members, may be halted to prevent said further upward movement of the operator to move the latch members into their open position.

4. A releasable latch apparatus as claimed in claim 3 in which the signalling means comprises a source of electric power, a lamp carried by the carriage and connected in an electrical circuit to said source, and a current controlling spring-loaded switch located in the path of the latch members to engage and be closed by the latter as said latter reach their open position to thereby close the current and energize the lamp.

References Cited by the Examiner

UNITED STATES PATENTS 2,902,738    9/59    Owens _____ 24—230
3,109,677    11/63   Hoover _____ 294—110

DONLEY J. STOCKING, Primary Examiner.

BOBBY R. GAY, Examiner.